United States Patent [19]

Boyett et al.

[11] 4,106,207
[45] Aug. 15, 1978

[54] POINT TO POINT SELF-LEVELING PLUMBING DEVICE

[76] Inventors: Vernon Hugo Boyett, 310 Lakeshire Dr., Daly City, Calif. 94015; Robert W. Devine, 743 Montezuma Dr., Pacifica, Calif. 94044

[21] Appl. No.: 712,868

[22] Filed: Aug. 9, 1976

[51] Int. Cl.² .................. G01C 15/02; G01C 15/10
[52] U.S. Cl. ................................ 33/286; 33/227; 33/299
[58] Field of Search ............. 33/227, 286, 291, 299, 33/397; 240/6.4 R, 10.66, 10.69

[56] References Cited

U.S. PATENT DOCUMENTS

| 2,517,295 | 8/1950 | Esher | 33/397 |
|---|---|---|---|
| 2,571,287 | 10/1951 | Peters | 33/291 |
| 3,462,845 | 8/1969 | Matthews | 33/291 |
| 3,505,739 | 4/1970 | Abrams | 33/227 |
| 3,772,797 | 11/1973 | Gleba | 33/227 |
| 3,911,588 | 10/1975 | Ohneda | 33/227 |

FOREIGN PATENT DOCUMENTS

| 1,162,395 | 4/1958 | France | 33/227 |
|---|---|---|---|
| 130,265 | 12/1950 | Sweden | 33/397 |

*Primary Examiner*—Richard E. Aegerter
*Assistant Examiner*—Richard R. Stearns
*Attorney, Agent, or Firm*—Warren M. Becker

[57] ABSTRACT

A tubular aluminum housing, having vertically centered pinpoint light bulbs at either end in nose cones, is suspended on a stand by a gimbal system, and has an on-off switch and batteries such that the light bulbs will emit aligned light beams above and below the housing. The nose cones are threaded onto the housing such that they can be moved upwardly and downwardly for focusing of the light beams. Colluminator and magnifying lenses are contained in the nose cones for magnification and additional focusing. A wind shield is disposed on the stand around the housing.

5 Claims, 3 Drawing Figures

POINT TO POINT SELF-LEVELING PLUMBING DEVICE

BACKGROUND OF THE INVENTION

This invention relates to a device for plumbing construction members, such as structural steel columns and the like.

The construction industry has traditionally used plumb bobs for achieving exact vertical placement of column and wall forms and similar building units. More recently, laser devices have been employed for both leveling and plumbing operations. In one such laser device, a beam of laser light spins in either a horizontal or vertical plane for horizontal or vertical alignment, whereas for plumbing the beam is directed upward and downward, from floor to ceiling.

Despite the precision available using laser devices, they are often disadvantageous due to their cumbersome size. Where they combine both plumbing and leveling operations, they are even more bulky and hard to work with. Their sophisticated make-up obviously gives rise to high cost and maintenance. Also, none of the laser devices has been developed for use in a single-step plumbing operation, but only in combination with leveling systems. As a result, the laser devices are not self-leveling but must themselves be adjusted for each operation to make sure they are level.

In accordance with the present invention, a point to point, self-leveling plumbing device comprising a gimbal-suspended tubular housing, having vertically centered pinpoint light sources at either end, is provided for achieving a one-step, low-cost plumbing operation. Preferably, battery-powered light bulbs having concave reflectors at their bases, are disposed within the housing and emit light beams at either end, the upper and lower beams being aligned. Colluminating and magnifying lenses are contained in nose cones threaded onto each end of the housing, the nose cones being movable so as, together with the lenses, to allow focusing of the light beams to a spot a given distance from the device.

It is a particular object of this invention to provide a safe, low-cost plumbing device that can be operated by a single person.

It is a still further object of this invention to provide a plumbing device that can be operated without any time-consuming adjustments.

A further object of this invention is a plumbing device for plumbing in one operation a point such as that which is formed by the intersection of two lines.

The above and other objects of the invention will be apparent from the ensuing description and appended claims.

DESCRIPTION OF THE DRAWINGS

One embodiment of the invention is shown by way of example in the accompanying drawings, in which.

DESCRIPTION OF PREFERRED EMBODIMENT

Figure 1:
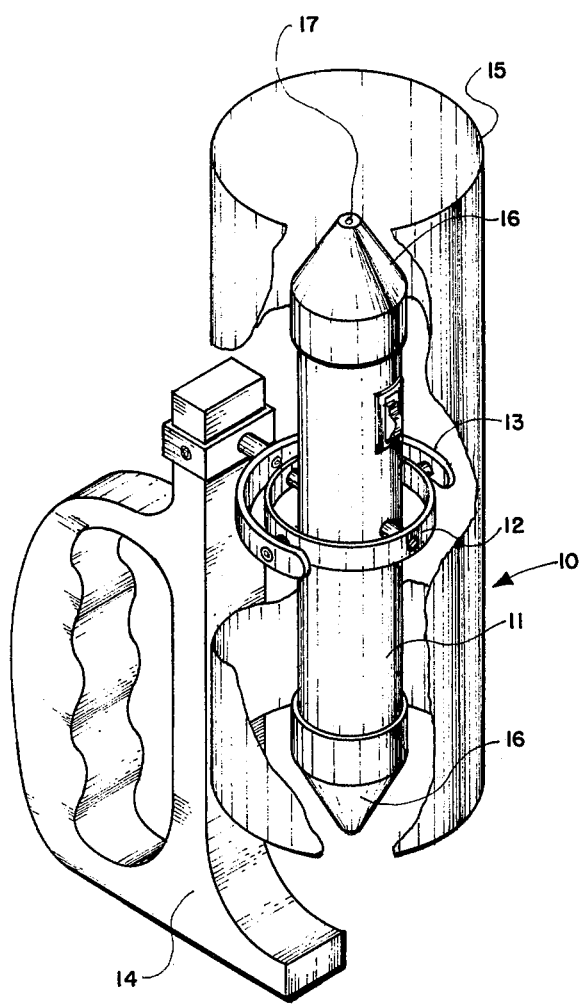
FIG. 1 is a perspective view of the plumbing device of this invention, with the wind shield partially broken away.

Referring to FIG. 1 of the drawings, plumbing device 10 has a tubular aluminum housing 11 suspended by steel gimbal rings 12, 13, on a stand 14. The stand 14 is formed with means forming a handle. The handle is provided for holding the plumbing device 10 at selected levels above a floor or below a ceiling or other underlying or overlying surface. It is provided also for holding the device against the surface of a member to be plumbed. Attached to the stand 14 is a windshield 15. Wind shield 15, partially broken away, surrounds the housing to assure undisturbed self-leveling of the housing. The housing 11 has nose cones 16 and openings 17, through which light is emitted above and below the housing.

The stand 14 is shown in the form of a floor support for the gimbal rings 12, 13 and housing 11, but alternate stands may be constructed for use in plumbing over elevator shafts and similar open areas. That is, the plumbing device is light enough so that little by way of support is required.

Figure 2:
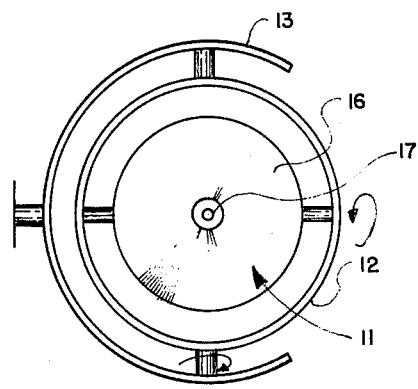
FIG. 2 is a top view of the plumbing device without the stand and wind shield.

In FIG. 2, tubular housing 11 (as shown in FIG. 1) is suspended first by gimbal ring 12, so that it can rotate on one axis, and then by gimbal ring 13, so that it can rotate on a second axis. The gimbals 12 and 13 are connected to the housing 11 in such a manner and at a position sufficiently above its center of gravity such that the housing becomes self-leveling, thereby enabling the housing to retain a plumb position once it has been set. In practice, the pivotable connections between the gimbals, stand and housing have the lowest practical coefficients of friction for providing maximum accuracy. For this purpose various types of commercially available bearing surfaces may be used.

Figure 3:
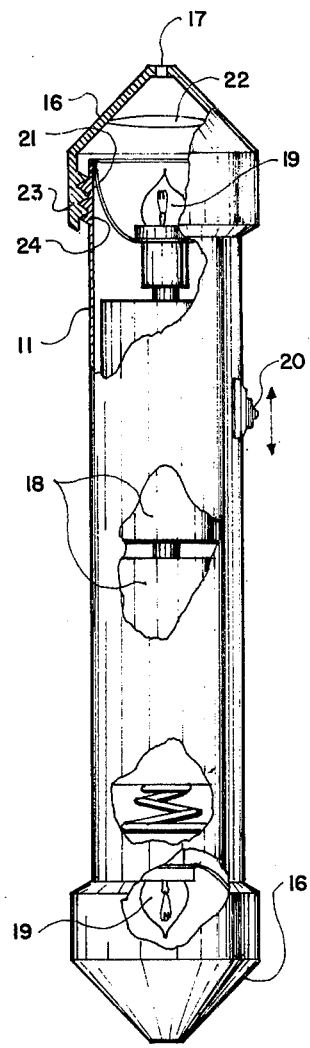
FIG. 3 is a broken-away elevational view of the tubular housing used in the plumbing device.

In FIG. 3, tubular housing 11 contains two, preferably rechargeable, storage batteries 18, which power pinpoint light bulbs 19 when switch 20 is turned to its "on" position. The bulbs 19 have concave reflector plates 21 at their bases and associated lenses 22 for focusing and colluminating the light beams into a pair of vertically aligned beams which are centered in openings 17 into spots above and below the housing. The focusing and colluminating of the beams into spots above and below the housing are provided so that a single operator can plumb a point above and below the housing in a single operation. This avoids the necessity of moving equipment such as laser equipment from a first position to a second position to obtain a pair of intersecting lines for forming the point as has been required in the past. The nose cones 16 have threads 23 so they can be screwed onto threads 24 on the ends of the housing 11.

Either rechargeable batteries, as shown, or plug-in electrical power can be used in the invention, including standard 110-volt power sources. If desired, other light sources can be adapted for creating the pinpoint light spots. Also, an adjustable marking pole can be appended to the device for marking the spot plumbed and the wind shield can be adapted for use as a carrying case for the other members of the device.

It will thus be apparent that a new and useful plumbing device is provided. However, it is understood that various other changes and modifications, in addition to those suggested above, may be made to the embodiments described without departing from the spirit and scope of the present invention. For example, the various component parts, which may be made of metal, such as aluminum and steel, may also be constructed from various synthetic materials such as a variety of plastic materials which are suitable for such devices. Also, the various components may be shaped for specific applications. Accordingly, it is intended that the scope of the present invention be not determined solely by reference to the embodiments described, but rather be determined by reference to the claims hereinafter provided and their equivalents.

What is claimed is:

1. A point to point, self-leveling plumbing device comprising: a stand, an elongated hollow body having opposed open ends mounted on said stand, said stand including means forming a handle for holding said body at various distances above and below a first and a second surface, respectively, said distances including distances which may require focusing of either or both of said upper and said lower light beams with respect to said first and second surfaces, a gimbal system mounted on the stand and disposed within said hollow body, an elongated, pendulous housing suspended on the stand by the gimbal system, the housing having axially aligned openings at its upper and lower ends in general proximity to said opposed ends, said stand being shaped and configured to support said hollow body in a generally vertical orientation on a horizontal surface, means disposed within the housing for emitting an upper and a lower light through the aligned openings such that the upper light beam is aligned with the lower light beam, means for individually adjustably focusing said upper and lower light beams with respect to said first and second surfaces; and said hollow body defining on one side thereof a smooth, uninterrupted surface capable of making at least line contact with a planar surface.

2. The plumbing device of claim 1 wherein the light emitting means comprises vertically aligned light bulbs, and wherein the housing is of tubular construction and has adjustable nose cones, the nose cones each having a magnifying and colluminating lens for magnifying and focusing the associated light beam to a spot at a given distance from the plumbing device.

3. The plumbing device of claim 2 wherein the ends of the housing and the nose cones have screw threads such that the nose cones can be moved upwardly and downwardly on the housing for focusing the light beams into spots.

4. The plumbing device of claim 2 additionally comprising a concave-shaped reflector surrounding the base of each of the light bulbs for focusing of the light beams into spots.

5. The plumbing device of claim 1 wherein said elongated hollow body comprises a wind shield disposed on the stand for surrounding the housing and shielding the housing from air movement which might otherwise cause the housing to swing in the gimbal system.

* * * * *